United States Patent

Fauran et al.

[15] 3,687,965
[45] Aug. 29, 1972

[54] NOVEL 5-(N-SUBSTITUTED AMINOMETHYL)-2-OXAZOLIDINONES AND THEIR PROCESS OF PREPARATION

[72] Inventors: Claude P. Fauran, Paris; Claude J. Gouret, Meudon; Guy M. Raynaud; Colette A. Douzon, both of Paris, all of France

[73] Assignee: S. A. Delalande, Regnault, France

[22] Filed: Oct. 2, 1969

[21] Appl. No.: 863,354

[30] Foreign Application Priority Data

Oct. 22, 1968 Great Britain..........49,963/68

[52] U.S. Cl. ....260/307 C, 260/247.2 R, 260/268 H, 260/293.67, 424/248, 424/250, 424/267, 424/272
[51] Int. Cl...........................................C07d 85/28
[58] Field of Search........260/307 C, 268 H, 294.3 B, 260/247.2 B

[56] References Cited

UNITED STATES PATENTS 3,446,814   5/1969   Budnowski................260/307

OTHER PUBLICATIONS

Ludwig et al., C. A. 49, 12442–3 (1955).
Zikolova et al., C. A. 62, 13135 (1965).

*Primary Examiner*—Alex Mazel
*Assistant Examiner*—R. V. Rush
*Attorney*—Woodhams, Blanchard and Flynn

[57] ABSTRACT

5-aminomethyl-2-oxazolidinones of the general formula:

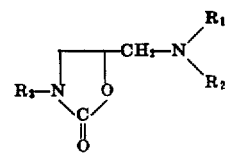

(1)

in which:

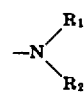

represents either a dialkylamino radical in which the alkyl portions have one to five carbon atoms, or a heterocyclic amino radical which may be substituted by an alkyl radical having one to five carbon atoms or by a pyrrolidinocarbonylmethyl radical, and $R_3$ represents a phenyl radical which may be substituted by one or more of the following radicals:
an alkoxy radical having one to five carbon atoms;
a halogen atom;
a trifluoromethyl radical, or
a carboxyl radical which may be esterified. The compound is made by reacting the corresponding 2-propanol derivative with ethyl carbonate. The compound possesses hypotensive, vasodilatatory, spasmolytic, sedative, myorelaxant, analgesic and anti-inflammatory properties.

7 Claims, No Drawings

NOVEL 5-(N-SUBSTITUTED AMINOMETHYL)-2-OXAZOLIDINONES AND THEIR PROCESS OF PREPARATION

The present invention concerns novel derivatives of 5-aminomethyl-2-oxazolidinones, their process of preparation and their therapeutic application.

The compounds according to the invention correspond to the general formula:

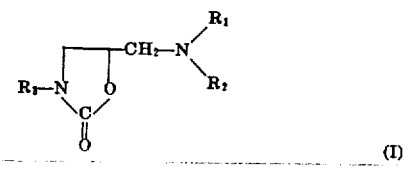

in which:

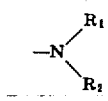

represents either a dialkylamino radical in which the alkyl portions have one to five carbon atoms, or a heterocyclic amino radical which may be substituted by an alkyl radical having one to five carbon atoms or by a pyrrolidinocarbonylmethyl radical, and $R_3$ represents a phenyl radical which may be substituted by one or more of the following radicals:
an alkoxy radical having one to five carbon atoms;
a halogen atom;
a trifluoromethyl radical, or
a carboxyl radical which may be esterified.

The process of preparing the compounds according to the present invention comprises treating a derivative of 2-propanol of the general formula:

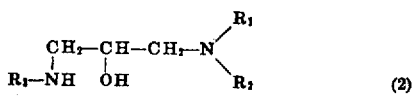

in which

and $R_3$ have the same significance as in Formula (1), with ethyl carbonate; eliminating any excess ethyl carbonate and purifying the produce obtained by recrystallization.

The following preparations are given as non-limitative examples to illustrate the invention.

EXAMPLE I

5-Pyrrolidinomethyl-3-phenyl-2-oxazolidinone

A mixture of 44 g. of 1-pyrrolidino-3-phenylamino-2-propanol and 95 g. of ethyl carbonate is progressively heated to about 130°C, which produces distillation of several ml. of ethyl carbonate. The mixture is allowed to cool and when the temperature reaches 100°C, 2 ml. of a solution of 15 percent sodium methylate in methanol is added thereto.

The mixture is then rapidly heated to boiling and the ethanol formed during the reaction is distilled off. When this distillation is completed, the excess ethyl carbonate is removed under reduced pressure. A solid product is obtained which is crystallized in isopropyl ether.

Yield = 59%  
Empirical formula = $C_{14}H_{18}N_2O_2$  
Melting point = 73°C

| Elementary analysis | C | H | N |
|---|---|---|---|
| Calculated % | 68.27 | 7.37 | 11.37 |
| Found % | 68.24 | 7.19 | 11.56 |

The base obtained by the above process, when treated with hydrochloric acid, yields the hydrochloride which melts, with decomposition, at 195°C.

EXAMPLE II

5-Dimethylaminomethyl-3-phenyl-2-oxazolidinone twenty-five g. of 1-dimethylamino-3-phenylamino-2-propanol are added to 60 g. of ethyl carbonate. After the temperature of the mixture was increased to 100°C, 5 ml. of a solution of 15 percent sodium methylate in methanol is added thereto. After distillation of the alcohol formed and the removal of excess ethyl carbonate, the residue obtained is taken up in 100 ml. of water and acidified with hydrochloric acid. The solution obtained is then washed with ether and rendered alkaline by the addition of soda. The resulting base is extracted with ether. On concentration of the etherified solution, a crystallized residue is obtained which is recrystallized in heptane.

Yield = 70%  
Empirical formula = $C_{12}H_{16}N_2O_2$  
Melting point = 48°C

| Elementary analysis: | C | H | N |
|---|---|---|---|
| Calculated % | 65.43 | 7.32 | 12.71 |
| Found % | 65.64 | 7.32 | 12.79 |

The hydrochloride is obtained by treating the base obtained by the above process in solution in acetone with hydrochloric acid. Melting point = 238°C

EXAMPLE III

5-Morpholinomethyl-3-phenyl-2-oxazolidinone 5-morpholinomethyl-3-phenyl-2-oxazolidinone is prepared according to the process described in the preceding examples from 24 g. of 1-morpholino-3-phenylamino-2-propanol and 47 g. of ethyl carbonate. The product obtained is recrystallized in 96° ethanol.

Yield = 65%  
Empirical formula = $C_{14}H_{18}N_2O_3$  
Melting point = 102°C

| Elementary analysis: | C | H | N |
|---|---|---|---|
| Calculated = % | 64.10 | 6.92 | 10.68 |
| Found = % | 64.02 | 6.91 | 10.67 |

The hydrochloride, prepared by the action of hydrochloric acid on the base, melts at 210°C.

EXAMPLE IV

5-Hexahydroazepinomethyl-3-phenyl-2-oxazolidinone

5-hexahydroazepinomethyl-3-phenyl-2-oxazolidinone is prepared according to the process described in the preceding examples from 38 g. of 1-hexahydroazepino-3-phenylamino-2-propanol and 71 g. of ethyl carbonate. The product obtained is recrystallized in isopropyl ether.

Yield = 70%  
Empirical formula = $C_{16}H_{22}N_2O_2$  
Melting point = 53°C

Elementary analysis:

| | C | H | N |
|---|---|---|---|
| Calculated = % | 70.04 | 8.08 | 10.21 |
| Found = % | 70.17 | 7.97 | 10.32 |

The hydrochloride, prepared by the action of hydrochloric acid on the base, melts at 210°C.

The compounds listed in the following Table I have been prepared according to the process described in the preceding examples.

The compounds according to the invention have been tested on animals in the laboratory and have shown, in particular, to possess hypotensive, vasodilatatory, spasmolytic, sedative, myorelaxant, analgesic and anti-inflammatory properties.

1. Hypotensive action

The administration of the compounds of the general Formula (1) provoke a durable diminution of the arterial pressure. There is equally observed a diminution of the contractile force and of the cardiac rhythm.

The results obtained with certain of the compounds of the general Formula (1) are shown in the following Table II:

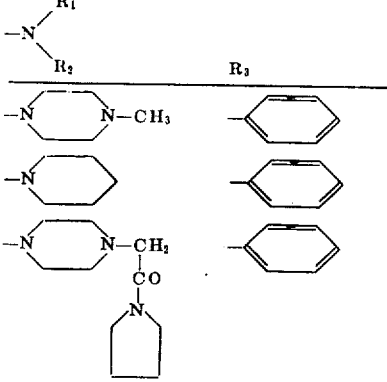

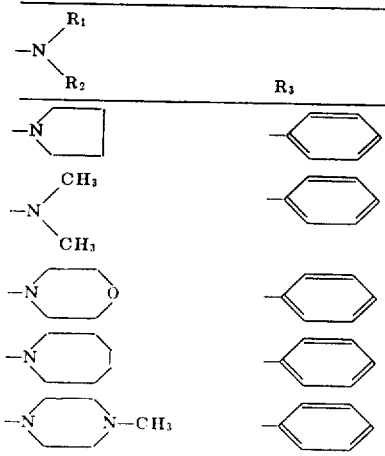

TABLE II—Continued

| $\begin{array}{c}R_1\\-N\\R_2\end{array}$ | $R_3$ | Salt | Animal treated | Administration Dose per kg. | Means | Hypotension Value in percent | Time in minutes |
|---|---|---|---|---|---|---|---|
|  | 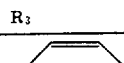 | HCl | Cat [1] | 2 mg. | IV | 40 | 30 |
|  |  | 2 HCl | Cat [1] | 50 mg. | IV | 50 | 30 |
| 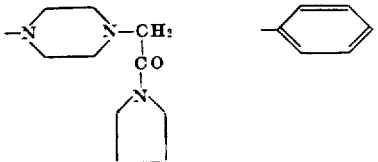 | 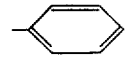 | HCl | Cat [1] | 10 mg. | IV | 50 | 10 |
|  | 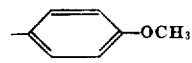 | HCl | Cat [1] | 20 mg. | IV | 50 | 10 |
|  | 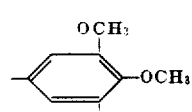 | HCl | Cat [1] | 12.5 mg. | IV | 50 | 10 |
|  | 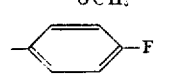 | HCl | Cat [1] | 10 mg. | IV | 45 | 10 |

[1] Anesthetized.  [2] Non-anesthetized.

2. Vasodilatatory action

The administration of the compounds of the general Formula (1) provoke, in the rabbit and the dog, a strong augmentation of the discharge of the femoral artery.

The results obtained with certain of the compounds of the general Formula (1) are shown in the following Table III:

3. Spasmolytic action

The compounds of the general Formula (1) exert an antagonistic action against the contractions provoked by barium chloride. This action, which is evidenced by

TABLE III

| $\begin{array}{c}R_1\\-N\\R_2\end{array}$ | $R_3$ | Salt | Animal treated | Dose administered in mg./kg./IA | Augmentation of general discharge Value in percent | Time in minutes |
|---|---|---|---|---|---|---|
|  | 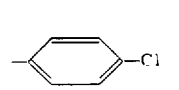 | HCl | Rabbit | 50 | 100 | |
|  |  | HCl | Rabbit<br>Dog | 50<br>50 | 90<br>60 | 8 |
|  |  | HCl | Rabbit<br>Dog | 50<br>50 | 120<br>50 | 15 |
|  | 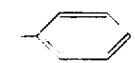 | 2 HCl | Dog | 50 | 50 | |
|  |  | HCl | Dog | 50 | 50 | |
|  | 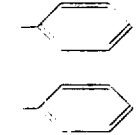 | 2 HCl | Dog | 100 | 50 | 15 |

Note.—IA means intra-arterial.

an inhibition of the contractions on the isolated duodenum of the rat is at least equal to that of papaverine.

By way of example, the spasmolytic power of 5-hexahydroazepinomethyl-3-phenyl-2-oxazolidinone is equal to 2.5 times that of papaverine.

4. Myorelaxant action

The compounds of the general Formula (1) inhibit, in the mouse, the turning, traction and equilibrium on a rotary rod reflexes. They equally suppress the lethal effects of strychnine in the same animal.

The results obtained with certain of the compounds of the general Formula (1) are shown in the following Table IV.

TABLE IV

| $R_1$ $-N$ $R_2$ | $R_3$ | Salt | $DL_{50}$ (mice) in mg./kg./PO | | | |
|---|---|---|---|---|---|---|
| | | | Turning rod | Traction reflex | Protection against strychnine | Turning reflex |
| -N⬡ | -⬡ | HCl | 115 | 200 | | |
| -N(CH₃)(CH₃) | -⬡ | HCl | 70 | | 90 | |
| -N⬡O | -⬡ | HCl | | | 54 | |
| -N⬡ | -⬡ | HCl | 75 | 150 | | 225 |

5. Sedative action

The administration of the compounds of the general Formula (1) evidence such action by an inhibition of the locomotric activity of the mouse and a reinforcement of the narcotic effects of penthiobarbital.

The results obtained with three compounds of the general Formula (1) are shown in the following Table V.

TABLE V

| $R_1$ $-N$ $R_2$ | $R_3$ | Salt | $DL_{50}$ (mice) in mg./kg./PO | |
|---|---|---|---|---|
| | | | Inhibition of locomotric activity | Potenheditation of penthiobarbitol |
| -N⬡ | -⬡ | HCl | 100 | 90 |
| -N(CH₃)(CH₃) | -⬡ | HCl | 70 | 78 |
| -N⬡ | -⬡ | NCl | 40 | 60 |
| -N⬡O | -⬡ | HCl | | 150 |

6. Analgesic action

The compounds of the general Formula (1) inhibit the contractions observed in the mouse following the intraperitoneal injection of phenylbenzoquinone.

The results obtained with three compounds of the general Formula (1) are shown in the following Table VI.

7. Anti-inflammatory action

The compounds of the general Formula (1) exert an antagonistic action against carraghenine in the rat by inhibiting the formation of a localized oedema following the under-plantary injection of such substance.

By way of example, the DE 50 for the hydrochloride of 5-pyrrolidinomethyl-3-phenyl-2-oxazolidinone is

TABLE VI

| $R_1$ $-N$ $R_2$ | $R_3$ | Salt | Analgesic dose 50 |
|---|---|---|---|
| -N⬡ | -⬡ | HCl | 90 mg. kg./PO |
| -N(CH₃)(CH₃) | -⬡ | HCl | 65 mg. kg. PO |
| -N⬡O | -⬡ | HCl | 65 mg. kg. PO |
| -N⬡ | -⬡ | HCl | 85 mg. kg. PO |

200 mg./kg. by oral means, and for the hydrochloride of 5-hexahydroazepinomethyl-3-phenyl-2-oxazolidinone is 90 mg./kg. by oral means.

As a result of the values obtained above and from the following Table VII, the difference between the pharmacologically active dose and the lethal dose is sufficiently large to enable the compounds of the general Formula (1) to be utilized in therapeutics.

TABLE VII

| $R_1$ $-N$ $R_2$ | $R_3$ | Salt | $DL_{50}$ (mice) in mg./kg. | |
|---|---|---|---|---|
| | | | Intravenous means | Oral means |
| -N⬡ | -⬡ | HCl | 88 | 550 |
| -N(CH₃)(CH₃) | -⬡ | HCl | 128 | 750 |
| -N⬡O | -⬡ | HCl | 187 | 1000 |
| -N⬡ | -⬡ | HCl | 37 | 550 |

TABLE VII — Continued

| $R_1$/$R_2$ (—N) | $R_3$ | Salt | DL$_{50}$ (mice) in mg./kg. Intravenous means | Oral means |
|---|---|---|---|---|
| —N(piperazino)N—CH₃ | phenyl | 2 HCl | 100 | |
| —N(piperidino) | phenyl | HCl | 37 | |
| —N(piperazino)N—CH₂—CO—N(pyrrolidino) | phenyl | 2 HCl | 477 | |
| —N(CH₃)₂ | C₆H₄—OCH₃ | HCl | 71.5 | |
| —N(CH₃)₂ | C₆H₃(OCH₃)₃ | HCl | 193 | |
| —N(CH₃)₂ | C₆H₄—F | HCl | 125 | |

The utilization of the compounds of the general Formula (1) has been indicated for the treatment of peripheral and cerebral vascular spasms, hypertensions, neurotic and excitative states as well as algias, especially rheumatism.

They may be administered in the form of tablets or gelules in doses of 10 to 200 mg. of active ingredient and injectable ampoules containing 1 to 100 mg. of active ingredient.

Accordingly, the present invention also comprises a pharmaceutical composition comprising a compound of the general Formula (1) together with a pharmaceutically acceptable carrier.

What we claim is:

1. A compound of the formula:

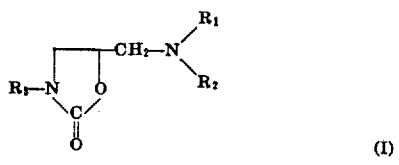

in which:

is selected from the group consisting of dimethylamino, morpholino, hexahydroazepino, pyrrolidino, N-methyl piperazino, N-pyrrolidinocarbonylmethyl piperazino and piperidino, and $R_3$ is phenyl or phenyl substituted by one or more of the following radicals:
an alkoxy radical having one to five carbon atoms;
a halogen atom;
a trifluoromethyl radical,
and the pharmaceutically acceptable acid addition salts thereof.

2. A compound as claimed in claim 1, in which the group

is dimethylamino.

3. A compound as claimed in claim 1, in which the group

is a pyrrolidino, morpholino, hexahydroazepino or piperidino radical.

4. A compound as claimed in claim 1, in which the group

is N-methylpiperazino or N-pyrrolidinocarbonylmethyl piperazino.

5. A compound as claimed in claim 1, in which the $R_3$ is p-methoxyphenyl or (3,4,5-trimethoxy)phenyl.

6. A compound as claimed in claim 1, in which $R_3$ is p-fluorophenyl or p-chlorophenyl.

7. A compound according to claim 1, in which the group

is dimethylamino and $R_3$ is phenyl.

* * * * *